(12) United States Patent
Yamamoto et al.

(10) Patent No.: US 8,646,557 B2
(45) Date of Patent: Feb. 11, 2014

(54) CONSTRUCTION MACHINE

(71) Applicant: Kobelco Construction Machinery Co., Ltd., Hiroshima (JP)

(72) Inventors: Keiji Yamamoto, Hiroshima (JP); Keiji Yamamoto, Hiroshima (JP); Toshiro Ueta, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 13/872,691

(22) Filed: Apr. 29, 2013

(65) Prior Publication Data

US 2013/0306388 A1    Nov. 21, 2013

(30) Foreign Application Priority Data

May 18, 2012  (JP) ................................ 2012-114451

(51) Int. Cl.
*B62D 33/06*         (2006.01)
(52) U.S. Cl.
USPC ....................................................... 180/89.12
(58) Field of Classification Search
USPC ........ 180/89.12, 311; 280/781, 785, 795, 797
See application file for complete search history.

(56) References Cited

U.S. PATENT DOCUMENTS 7,445,272 B2 *  11/2008  Lee ........................... 296/190.03
7,900,996 B2 *   3/2011  Kimura et al. ........... 296/190.09

FOREIGN PATENT DOCUMENTS

JP           8-284206           10/1996

* cited by examiner

*Primary Examiner* — Faye M. Fleming
(74) *Attorney, Agent, or Firm* — Oblon, Spivak, McClelland, Maier & Neustadt, L.L.P.

(57) ABSTRACT

A cab includes a floor plate that constitutes a floor surface of the cab and a frame-shaped lower frame which extends along a peripheral edge of the floor plate and which is fixed onto the floor plate. A swivel joint is arranged below the floor plate such that a part of the swivel joint overlaps with a peripheral edge of the lower frame in plan view. A floor-side projecting portion that projects upward is provided on the peripheral edge of the floor plate and a floor-side housing portion that houses the swivel joint is provided below the floor-side projecting portion. A frame-side projecting portion that projects upward is provided on the lower frame, and a frame-side housing portion that houses the floor-side projecting portion is provided below the frame-side projecting portion.

7 Claims, 6 Drawing Sheets

LEFT ←——→ RIGHT

CONSTRUCTION MACHINE

BACKGROUND OF THE INVENTION

1. Field of the Invention

The present invention relates to a construction machine.

2. Description of the Related Art

Construction machines including a lower propelling body, an upper slewing body provided on the lower propelling body, a cab provided on the upper slewing body, and a device such as a boom angle detector arranged in the periphery of the cab are conventionally known (for example, refer to Japanese Unexamined Patent Publication No. H8-284206 referred to as "Patent Document 1" hereinafter).

The cab described in Patent Document 1 has a concave portion that is formed by denting a part of a side surface of the cab in an inward direction in order to avoid interference with the device.

As described above, in the construction machine described in Patent Document 1, interference between the cab and the device is avoided by denting a part of a side surface of the cab instead of lifting the entire cab to alter a height position of the cab. Accordingly, an overall height of the construction machine is kept low to meet height restrictions that apply when transporting the construction machine.

However, in the construction machine according to Patent Document 1, the concave portion is formed by denting a part of the side surface of the cab in an inward direction. Therefore, a frame for supporting the side surface (for example, a panel member) of the cab is arranged similarly at a position shifted in an inward direction. Accordingly, there is a problem in that, due to reduced space inside the cab, space for work that is conducted inside the cab during production of the construction machine (for example, an operation for mounting the frame) cannot be effectively secured and workability of the operation declines.

Although sufficient work space can conceivably be secured by designing a control box and other components inside the cab in smaller sizes, this creates problems such that components can no longer be shared with other models and is therefore unfavorable.

SUMMARY OF THE INVENTION

An object of the present invention is to secure a wide space in a cab while avoiding interference between a device provided on an upper slewing body and the cab.

The present invention provides a construction machine including: a lower propelling body; an upper slewing body including an upper frame which is provided on the lower propelling body so as to be revolvable; a cab supported on the upper frame of the upper slewing body; and a device provided on the upper frame, wherein the cab includes a floor plate which is provided on the upper frame and which constitutes a floor surface of the cab, a frame-shaped lower frame which extends along a peripheral edge of the floor plate and which is fixed onto the floor plate, a column standing on the lower frame, and a panel member which is supported by the lower frame and the column and which constitutes an outer surface of the cab, the device is arranged below the floor plate such that a part of the device overlaps with a peripheral edge of the lower frame in plan view, a floor-side projecting portion which projects upward is provided on a peripheral edge of the floor plate and a floor-side housing portion which opens downward and which houses the device is provided below the floor-side projecting portion, and a frame-side projecting portion which projects upward is provided on the lower frame and a frame-side housing portion which opens downward and which houses the floor-side projecting portion is provided below the frame-side projecting portion.

DESCRIPTION OF THE PREFERRED EMBODIMENTS

Hereinafter, an embodiment of the present invention will be described with reference to the accompanying drawings. It should be noted that the embodiment described below is merely a concrete example of the present invention and is not intended to limit the technical scope of the present invention.

The respective drawings show directions of up-down and/or front-rear and left-right. Unless otherwise noted, the description will be given in accordance with these directions.

Figure 1:
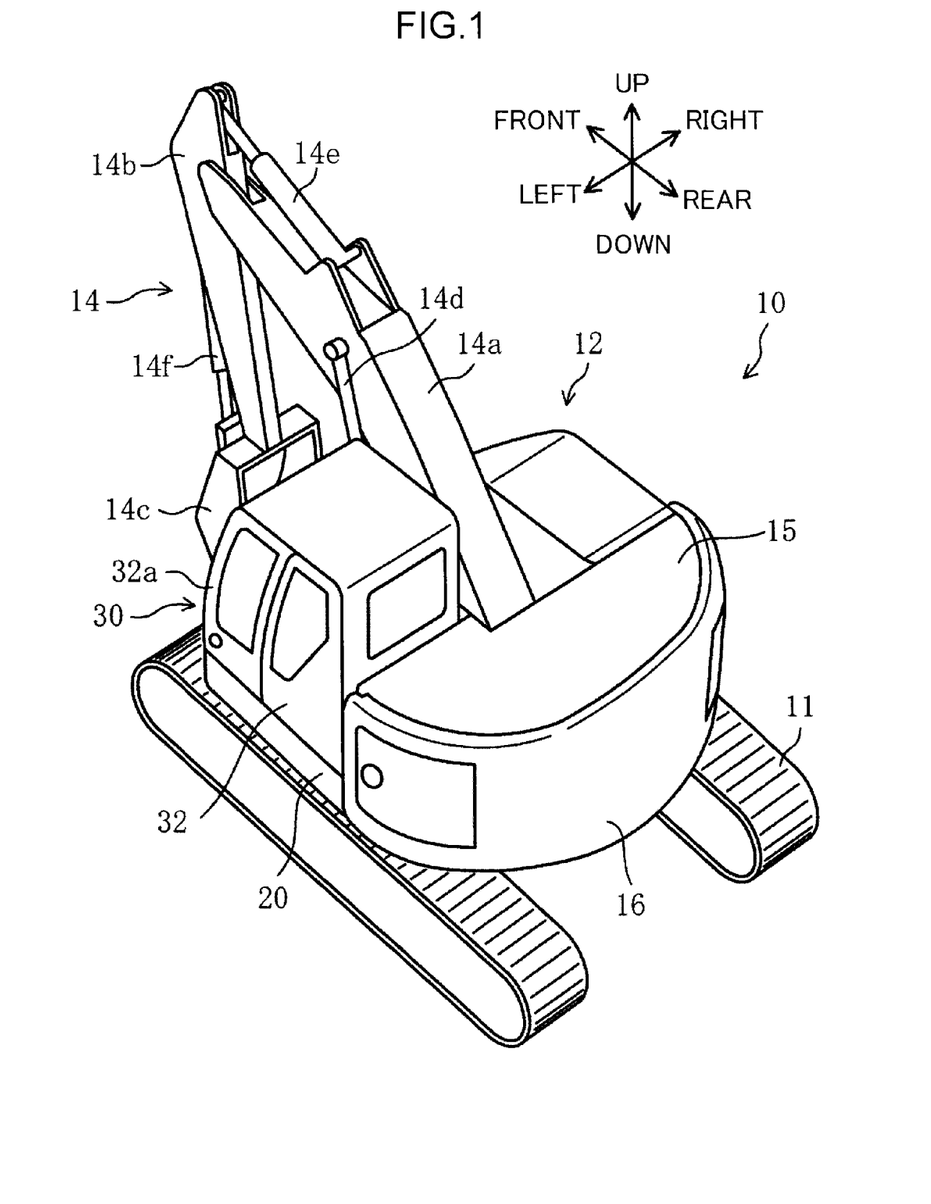
FIG. 1 is a perspective view showing a construction machine according to an embodiment of the present invention.

FIG. 1 is a perspective view showing a construction machine according to an embodiment of the present invention. As shown in FIG. 1, a construction machine 10 is a hydraulic shovel comprising a crawler-type lower propelling body 11 and an upper slewing body 12 that is provided on the lower propelling body 11 so as to be revolvable.

Moreover, the construction machine 10 according to the present embodiment is a rear tight-revolving hydraulic shovel. Specifically, an outline of a rear portion of the upper slewing body 12 is formed in an arc as viewed from above, and a turning radius of a rear portion of the construction machine 10 is set small such that the rear portion of the upper slewing body 12 does not protrude outward in a vehicle width direction.

Figure 2:
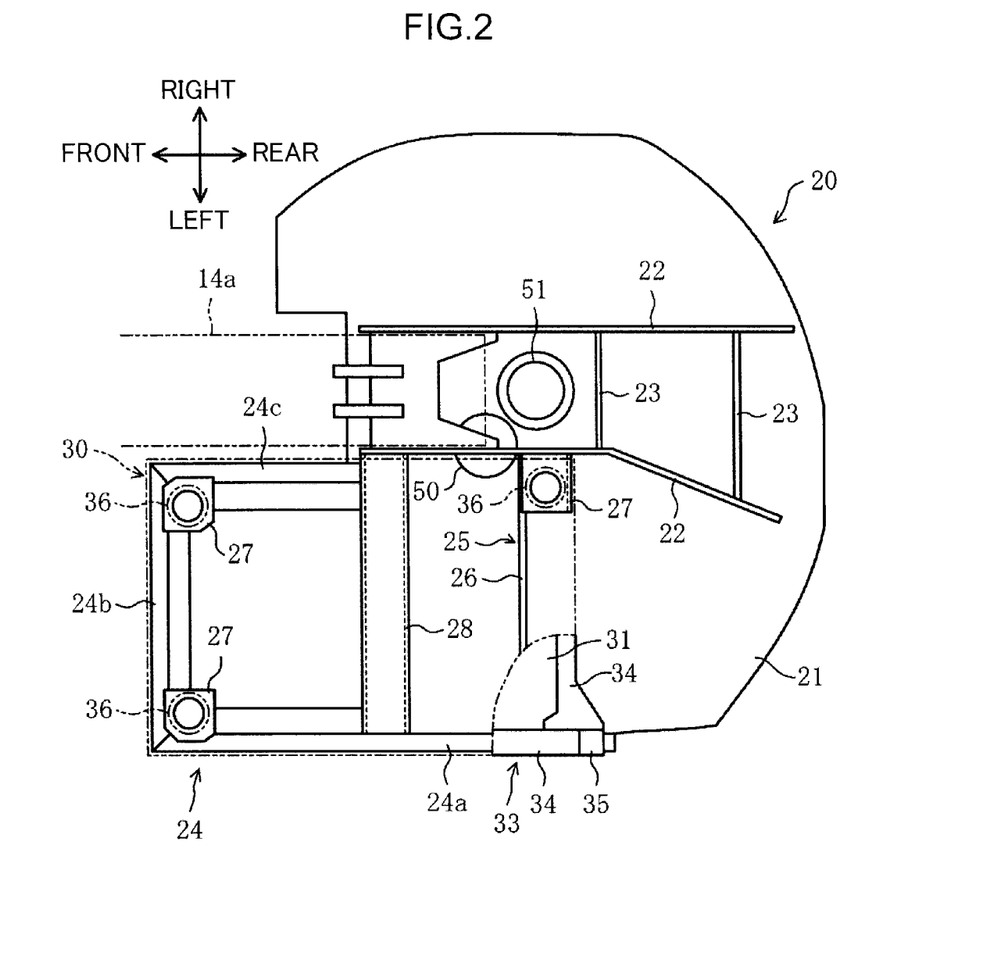
FIG. 2 is a plan view showing an enlargement of an upper frame shown in FIG. 1.

The upper slewing body 12 comprises an attachment 14, an engine room 15, a counter weight 16, an upper frame 20, a cab 30, a swivel joint 50 (device: refer to FIG. 2), and a revolving motor 51 (refer to FIG. 2).

The attachment 14 is attached to a front portion of the upper slewing body 12 (the upper frame 20) so as to be able to rise and fall. The attachment 14 comprises a boom 14a that is able to rise and fall with respect to the upper frame 20, an arm 14b that is swingable with respect to the boom 14a, and a bucket 14c that is swingable with respect to the arm 14b. In addition, the attachment 14 comprises a hydraulic cylinder 14d that raises and lowers the boom 14a with respect to the upper frame 20, a hydraulic cylinder 14e that swings the arm 14b with respect to the boom 14a, and a hydraulic cylinder 14f that swings the bucket 14c with respect to the arm 14b. Each of the hydraulic cylinders 14d to 14f elongates and contracts as pressure oil is supplied thereto or discharged therefrom. Accordingly, operations such as digging using the boom 14a, the arm 14b, and the bucket 14c are performed. The attachment 14 is operated from inside the cab 30.

The engine room 15 is provided in the rear portion of the upper slewing body 12. Although not shown, an engine, hydraulic equipment, and the like are housed in a closely-spaced state inside the engine room 15. A rear portion of the engine room 15 is covered by the counter weight 16.

Figure 3:
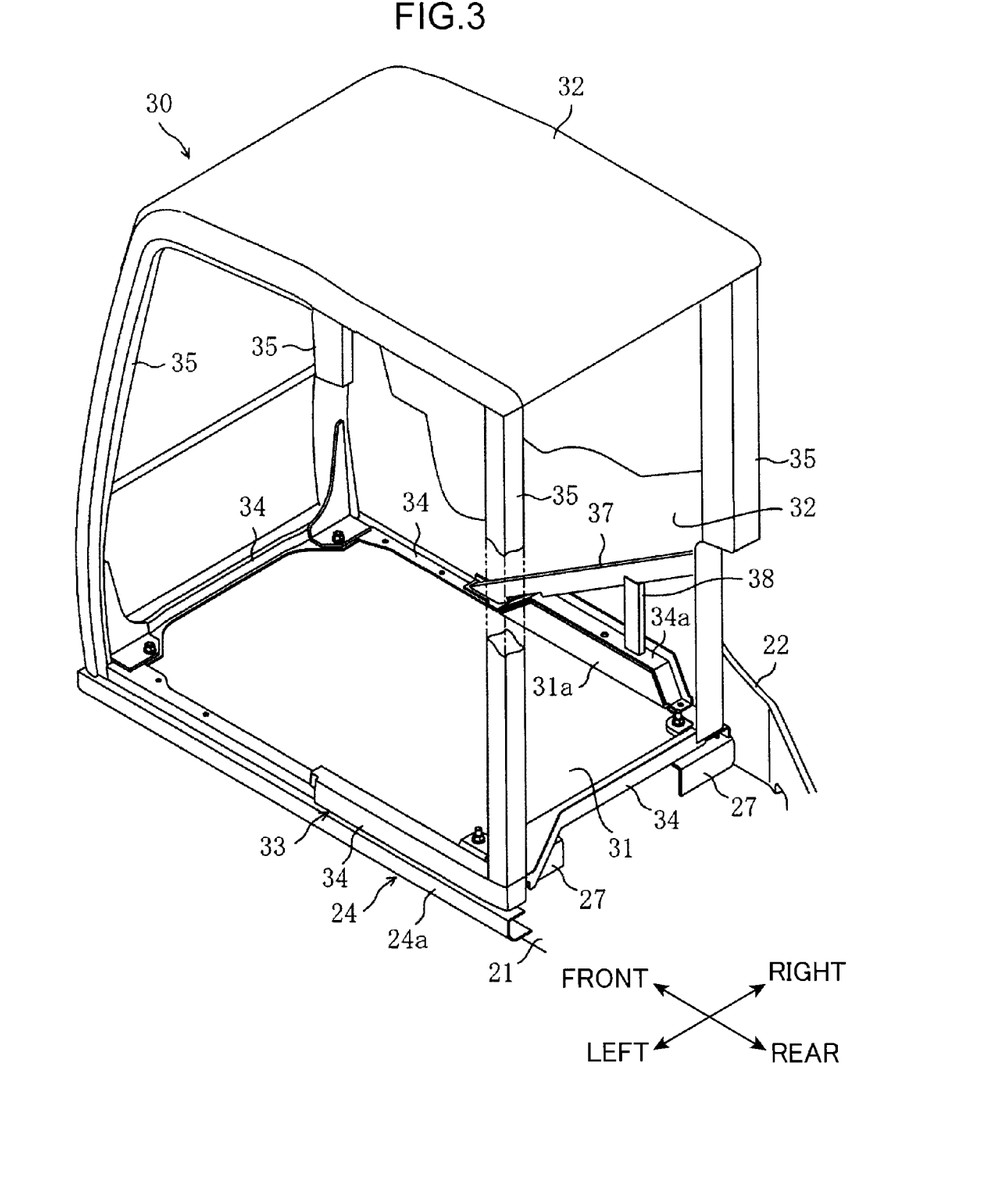
FIG. 3 is a perspective view of the cab shown in FIG. 1 with a part thereof omitted.

The cab 30 is arranged in a front left portion of the upper slewing body 12 so as to be adjacent to the attachment 14 and demarcates a rectangular box-like operating room. Specifically, as shown in FIG. 3, the cab 30 comprises a floor plate 31 that constitutes a floor surface of the cab 30, a cab mount 36 (refer to FIG. 2) for supporting the floor plate 31 on the upper frame 20, a panel member 32 that constitutes an outer surface of the cab 30, and a frame body 33 that supports the panel member 32. A door 32a that allows an operator to enter or exit the cab 30 is provided on a left side surface of the panel member 32.

FIG. 2 is a plan view of the upper frame. The upper frame 20 is provided on the lower propelling body 11 so as to be revolvable. Specifically, the upper frame 20 comprises a bottom plate 21, a pair of left and right longitudinal plates 22, a longitudinal plate-connecting plate 23, and a side deck 24.

The bottom plate 21 is a metal plate which is arranged in a horizontal direction and which has a large thickness. A central portion of the bottom plate 21 is supported by the lower propelling body 11 so as to be revolvable. The pair of longitudinal plates 22 is standing on the bottom plate 21.

Each longitudinal plate 22 is constituted by a metal plate with a large thickness. In addition, each longitudinal plate 22 is bonded to an upper surface of the bottom plate 21 while being standing on the bottom plate 21. The pair of left and right longitudinal plates 22 is arranged spaced apart from each other in a left-right direction so as to extend in a front-rear direction. Moreover, the left longitudinal plate 22 comprises a front portion that extends in a front-rear direction and an inclined portion that inclines to the left and toward the rear from the front portion. The boom 14a is rotatably supported at the front portions of the longitudinal plates 22.

The swivel joint 50 (device) is installed at a center position of revolution of the bottom plate 21. A revolving motor 51 that revolves the upper slewing body 12 is provided in a vicinity of the swivel joint 50 and between the pair of longitudinal plates 22.

Hydraulic tubes (not shown) respectively provided on the lower propelling body 11 and the upper slewing body 12 are connected to the swivel joint 50. The swivel joint 50 comprises two portions that rotate relative to each other in conjunction with a revolving movement of the upper slewing body 12. By connecting the hydraulic tube on the side of the lower propelling body 11 to one of the two portions and connecting the hydraulic tube on the side of the upper slewing body 12 to the other portion, the respective hydraulic tubes are held while being prevented from twisting. The swivel joint 50 is arranged below the floor plate 31 such that a part of the swivel joint 50 overlaps a right edge of the floor plate 31 of the cab 30 in plan view. Moreover, a configuration for avoiding interference between the swivel joint 50 and the floor plate 31 will be described later.

The longitudinal plate-connecting plate 23 is provided between the pair of longitudinal plates 22 and is constituted by a metal plate with a large thickness. Left and right end portions of the longitudinal plate-connecting plate 23 are respectively bonded to mutually-opposing surfaces of the longitudinal plates 22. Accordingly, the pair of longitudinal plates 22 is coupled to each other by the longitudinal plate-connecting plate 23.

Anti-vibration cab mounts 36 are respectively arranged at four corners of the floor plate 31 (three cab mounts 36 are shown in FIG. 2). The side deck 24 is a frame-like member that is mounted to the bottom plate 21 so as to protrude forward from a front left portion of the bottom plate 21 in accordance with the arrangement of the cab 30. The side deck 24 will be described in detail later. The mount base portion 27 is provided on the side deck 24 at a position corresponding to the cab mounts 36. Open circular holes are provided on an upper surface of the mount base portion 27. The cab mounts 36 are installed on the mount base portion 27 in a state where the cab mounts 36 are inserted through the circular holes. The floor plate 31 of the cab 30 is supported by the side deck 24 via the cab mounts 36. Therefore, vibration generated on the upper frame 20 upon activation of the construction machine 10 is reduced by the cab mounts 36 and, as a result, vibration of the cab 30 is suppressed.

The side deck 24 includes a left frame 24a that extends in a front-rear direction on the side of a left end portion of the bottom plate 21, a front frame 24b that extends rightward from a front end portion of the left frame 24a, a right frame 24c which extends rearward from a right end portion of the front frame 24b and which comprises a rear end portion that is bonded to the bottom plate 21, a transverse beam 25, and a reinforcing beam 28. The side deck 24 is formed in a frame shape by the respective frames 24a to 24c. Mount base portions 27 are respectively provided at left and right end portions of the front frame 24b, and each of the mount base portions 27 supports one of the two front cab mounts 36 of the cab 30.

The transverse beam 25 is provided at a position near a rear portion of the cab 30 and between the left longitudinal plate 22 and the left frame 24a. The transverse beam 25 comprises a connecting portion 26 which is formed by a plate material standing on the bottom plate 21 and which connects the left longitudinal plate 22 and the left frame 24a with each other, and the two mount base portions 27 which respectively extend rearward from both end portions of the connecting portion 26 in a vehicle width direction (left-right direction) and which each supports one of the two rear cab mounts 36 of the cab 30. The mount base portions 27 are integrated with the connecting portion 26 by being respectively bonded to left and right end portions of the connecting portion 26.

The reinforcing beam 28 is a member which has a C-shaped cross section that opens downward and which is provided to the front of the transverse beam 25. Left and right end portions of the reinforcing beam 28 are respectively bonded to mutually-opposing surfaces of the left longitudinal plate 22 and the left frame 24a. Accordingly, the left longitudinal plate 22 and the left frame 24a are connected to each other by the reinforcing beam 28.

FIG. 3 is a perspective view showing the cab. Note that a part of the panel member 32 is not shown in FIG. 3. As shown in FIG. 3, the panel member 32 constituting the outer surface of the cab 30 is supported by the rectangular box-like frame body 33. The frame body 33 comprises a frame-shaped lower frame 34 which extends along a peripheral edge of the floor plate 31 of the cab 30 and which is fixed onto the floor plate 31, four columns 35 standing at four corners of the lower frame 34, an upper frame (not shown) which extends along a ceiling portion of the cab 30 and which connects upper end portions of the columns 35 with each other, a cab reinforcing beam 37 (cab reinforcing member), and a connecting beam 38 (connecting member).

As shown in FIGS. 3 to 6, a floor-side projecting portion 31a that projects upward is provided at a right edge portion of the floor plate 31, and a floor-side housing portion 31d which opens downward and which houses the swivel joint 50 is provided below the floor-side projecting portion 31a. The swivel joint 50 is arranged below the floor-side projecting portion 31a such that a part of the swivel joint 50 overlaps with the floor plate 31 in plan view (refer to FIG. 6). As shown, by providing the floor-side projecting portion 31a on the floor plate 31, interference between the swivel joint 50 and the floor plate 31 can be avoided in a vertical direction. Floor-side inclined surfaces (guiding surfaces) 31b that are inclined such that the floor-side projecting portion 31a becomes narrower as extending upward are formed at both end portions of the floor-side projecting portion 31a in a front-rear direction (a longitudinal direction along the peripheral edge of the floor plate 31).

A frame-side projecting portion 34a that projects upward is provided in a right portion (a portion arranged along the left longitudinal plate 22) of the lower frame 34, and a frame-side housing portion 34d which opens downward and which houses the floor-side projecting portion 31a is provided below the frame-side projecting portion 34a. The frame-side projecting portion 34a is provided on the lower frame 34 at a position other than standing positions of the columns 35. In addition, frame-side inclined surfaces (guiding surfaces) 34b that are inclined such that the opening of the frame-side housing portion 34d becomes wider as extending downward are formed at both end portions of the frame-side projecting portion 34a in a front-rear direction (a longitudinal direction along the peripheral edge of the floor plate 31). The frame-side inclined surface 34b and the floor-side inclined surface 31b respectively constitute guiding surfaces for guiding the frame-side projecting portion 34a and the floor-side projecting portion 31a to a predetermined fitting position during a fitting process thereof. In addition, a standing portion 34c that extends upward is provided at a right end edge of the frame-side projecting portion 34a. The standing portion 34c is bonded to an inner surface of the right panel member 32.

Figure 4:
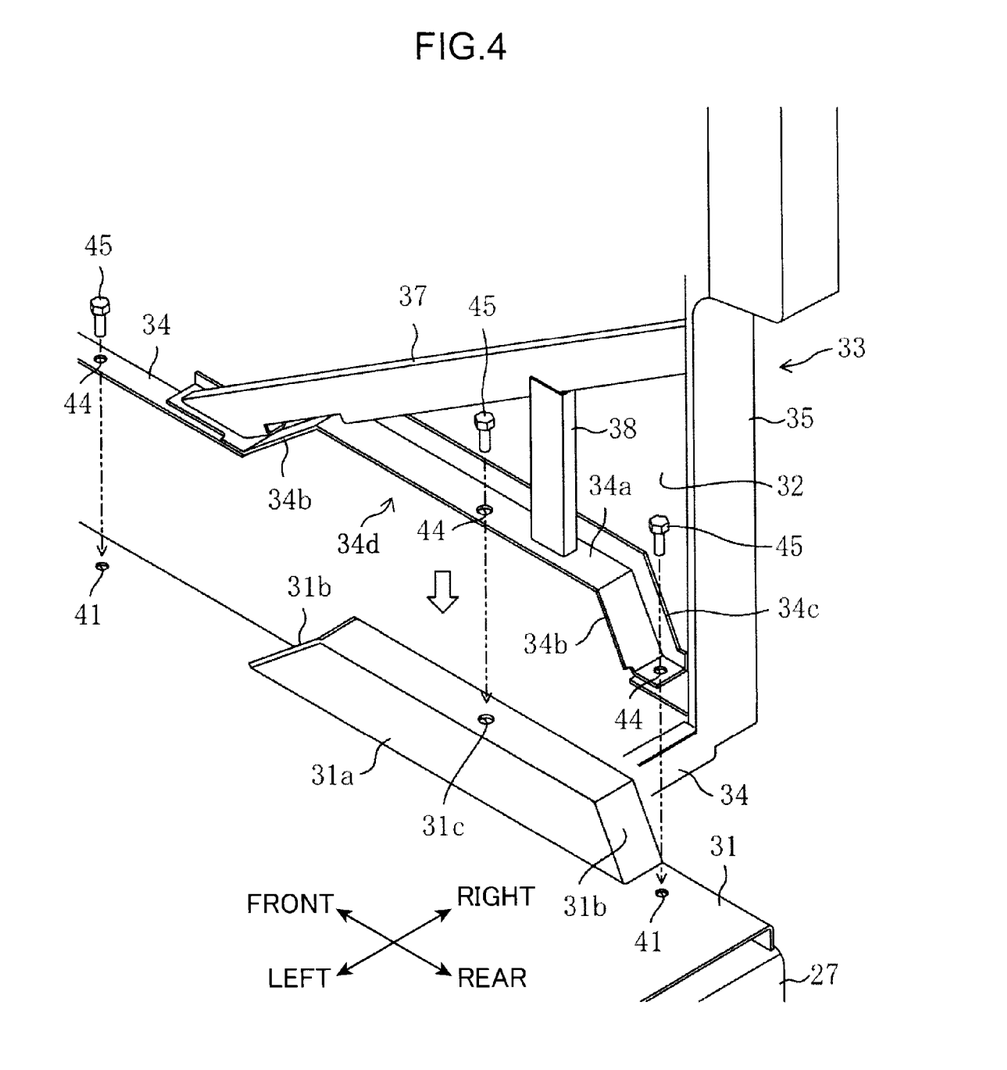
FIG. 4 is an exploded perspective view showing a configuration of a periphery of a floor-side projecting portion and a frame-side projecting portion in the cab shown in FIG. 3.

As shown in FIG. 4, the cab reinforcing beam 37 comprises an upper end that is connected to the right rear column 35 above the frame-side projecting portion 34a of the lower frame 34 and a lower end that is connected to the lower frame 34 at a position opposite to the column 35 across the frame-side projecting portion 34a (to the front of the frame-side projecting portion 34a).

The connecting beam 38 connects the cab reinforcing beam 37 and the frame-side projecting portion 34a with each other. Specifically, the connecting beam 38 comprises an upper end that is connected to a middle portion of the cab reinforcing beam 37 and a lower end that is connected to an upper surface of the frame-side projecting portion 34a. Accordingly, the frame-side projecting portion 34a and the column 35 can be connected to each other with the cab reinforcing beam 37 and the connecting beam 38 (connecting mechanism). In other words, the frame-side projecting portion 34a is held in a state where the frame-side projecting portion 34a is suspended from the cab reinforcing beam 37 (or the column 35 connected to the cab reinforcing beam 37) by the connecting beam 38. Therefore, when suspending the frame body 33 with a crane or the like, a suspending force generated on the column 35 can also be transferred to the frame-side projecting portion 34a via the connecting mechanism and, consequently, deflection of the frame-side projecting portion 34a can be suppressed.

Figure 5:
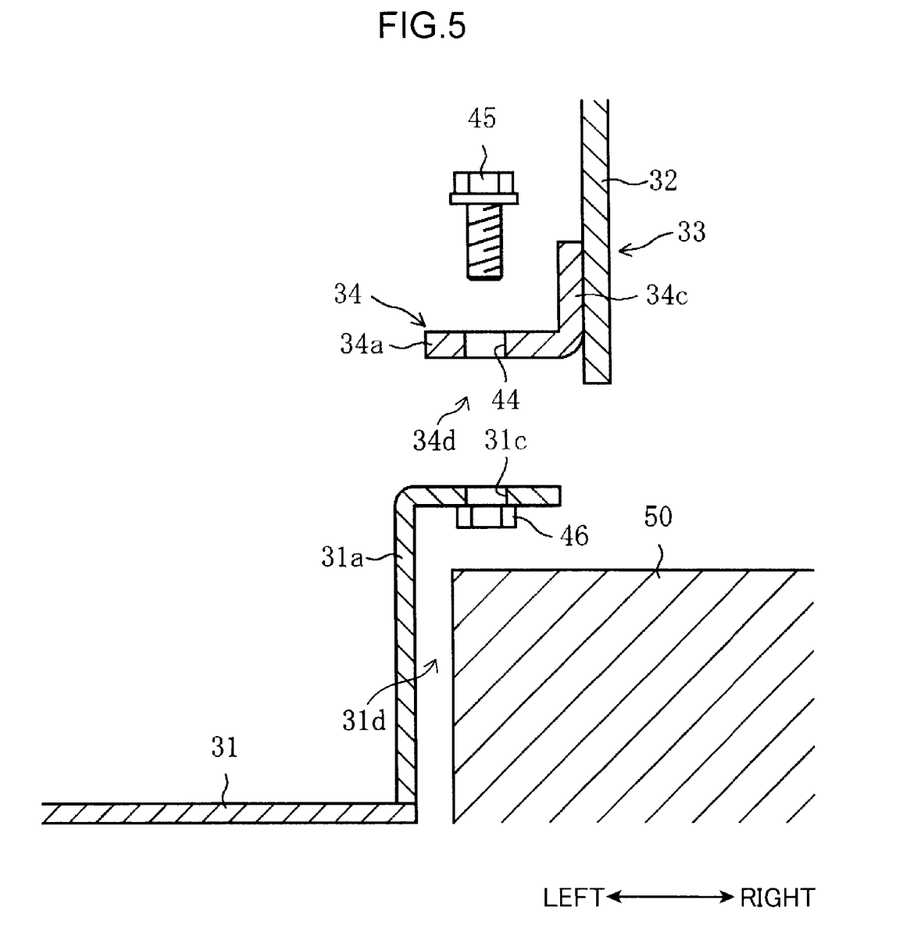
FIG. 5 is a front sectional-view showing a state before a lower frame is fixed to a floor plate.
Figure 6:
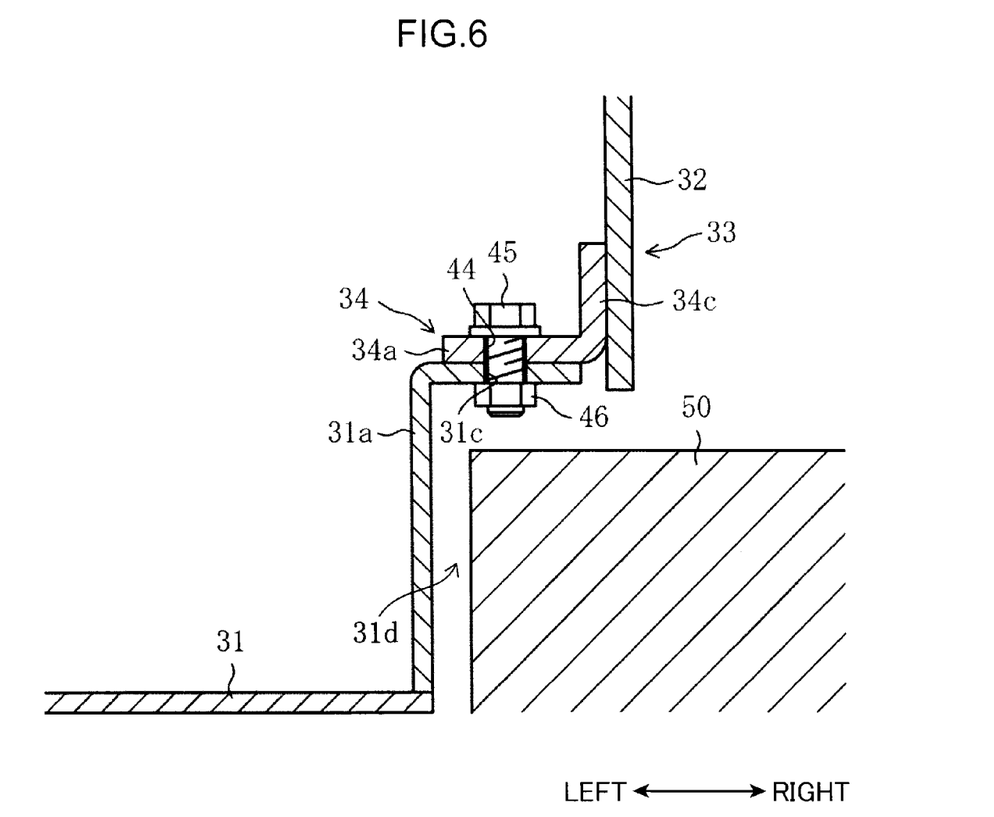
FIG. 6 is a front sectional-view showing a state where the lower frame is fixed to the floor plate.

The frame body 33 (the lower frame 34) is fastened and fixed onto the floor plate 31 by fastening bolts 45. Specifically, as shown in FIGS. 4 and 5, when mounting the frame body 33 onto the floor plate 31, the frame body 33 is suspended by a crane (not shown) and the frame body 33 is gradually lowered in a state where the frame-side projecting portion 34a of the lower frame 34 is positioned directly above the floor-side projecting portion 31a of the floor plate 31. In addition, the lower frame 34 is placed on the floor plate 31 while fitting the frame-side projecting portion 34a and the floor-side projecting portion 31a to each other.

Subsequently, screw portions of the fastening bolts 45 are inserted into through holes 44 formed on the frame-side projecting portion 34a and a through hole 31c formed on the floor-side projecting portion 31a, and the fastening bolts 45 are fastened to fastening nuts 46 that are bonded to a lower surface of the floor-side projecting portion 31a. Accordingly, the frame-side projecting portion 34a and the floor-side projecting portion 31a can be fastened and fixed (refer to FIG. 6).

In addition, a plurality of screw holes 41 are formed on the floor plate 31 along the peripheral edge portion of the floor plate 31, and a plurality of through holes 44 are formed on the lower frame 34 at positions corresponding to the screw holes 41. By inserting the screw portions of the fastening bolts 45 into the through holes 44 of the lower frame 34 and fastening the screw portions of the fastening bolts 45 to the screw holes 41, the lower frame 34 is fastened and fixed onto the floor plate 31.

As described above, interference between the swivel joint 50 and the floor plate 31 and the lower frame 34 can be avoided in the vertical direction by the floor-side projecting portion 31a and the frame-side projecting portion 34a. Therefore, an inner width of the frame-shaped lower frame 34 provided along the peripheral edge of the floor plate 31 (in the present embodiment, an interval between portions respectively arranged on left and right sides among the lower frame 34) can be kept more or less the same as in conventional configurations. Accordingly, since a mounting operation of the lower frame 34 can be performed in a large secured space inside the cab 30, workability is improved. In addition, since the need for designing devices such as a control box in smaller sizes in order to secure the large space inside the cab 30 is omitted, standardization of devices can be promoted.

Furthermore, according to the embodiment described above, the following advantageous effects can be achieved.

By fitting the frame-side projecting portion 34a to the floor-side projecting portion 31a, the frame-side projecting portion 34a and the floor-side projecting portion 31a can be assembled in a state where the lower frame 34 is positioned relative to the floor plate 31. As a result, workability of a mounting operation of the floor plate 31 and the lower frame 34 can be improved.

The floor-side projecting portion 31a and the frame-side projecting portion 34a are provided with the floor-side inclined surface 31b and the frame-side inclined surface 34b as guiding surfaces. Therefore, by causing the inclined surfaces 31b and 34b to slide against each other in accordance with the descent of the lower frame 34 toward the floor plate 31, the projecting portions 31a and 34a can be fitted to each other in a smooth manner.

In particular, since the floor-side inclined surface 31b and the frame-side inclined surface 34b are respectively formed at both end portions of the floor-side projecting portion 31a and the frame-side projecting portion 34a, an operation for assembling the lower frame 34 of the cab 30 to the floor plate 31 can be performed with greater ease. Specifically, since the frame-side inclined surface 34b of the lower frame 34 is formed in a tapered shape such that an opening of the frame-side housing portion 34d becomes wider as extending downward, the frame-side projecting portion 34a of the lower frame 34 can be positioned relative to and fitted to the floor-side projecting portion 31a in a smooth manner.

In the embodiment described above, the frame-side projecting portion 34a is provided on the lower frame 34 at a position other than standing positions of the columns 35. Therefore, when the columns 35 are suspended by a crane or the like in a state where the columns 35 and the lower frame 34 are connected to each other, since the lower frame 34 is to be supported at positions (the columns 35) other than the frame-side projecting portion 34a, deflection of lower frame 34 may occur at the frame-side projecting portion 34a. However, in the embodiment described above, since the cab reinforcing beam 37 and the connecting beam 38 are provided as a connecting mechanism for connecting the frame-side projecting portion 34a and the columns 35 to each other, a suspending force generated on the columns 35 can also be transferred to the frame-side projecting portion 34a via the connecting mechanism. Therefore, deflection of the lower frame 34 during suspension can be suppressed.

The columns 35 and the cab reinforcing beam 37 are connected to the lower frame 34 at both side positions of the frame-side projecting portion 34a and, at the same time, the connecting beam 38 is connected to the frame-side projecting portion 34a. Therefore, since a suspending force generated on the columns 35 during suspension of the lower frame 34 can be transferred to both side positions of the frame-side projecting portion 34a and to the frame-side projecting portion 34a, deflection of the lower frame 34 can be prevented more effectively.

Other Embodiments

Moreover, in the present embodiment, the swivel joint 50 is arranged such that a part of the swivel joint 50 overlaps with a right edge of the floor plate 31 of the cab 30. Therefore, in order to avoid interference between the swivel joint 50 and the floor plate 31, the floor-side projecting portion 31a is provided in a right edge portion of the floor plate 31 and the frame-side projecting portion 34a is provided in a right portion of the lower frame 34. However, the present invention is not limited to this mode.

For example, when the cab 30 is arranged at a position on a right side of the upper slewing body 12, a left edge of the floor plate 31 overlaps with a part of the swivel joint 50. Therefore, in this case, the floor-side projecting portion 31a may be provided in a left end portion of the floor plate 31 and the frame-side projecting portion 34a may be provided in a left portion of the lower frame 34.

While the swivel joint 50 has been exemplified as a device with which interference is avoided due to the floor-side projecting portion 31a in the embodiment above, the device is not limited to the swivel joint 50. For example, when a device other than the swivel joint 50 is arranged so as to overlap with the peripheral edge of the floor plate 31 in plan view, interference between the device and the floor plate 31 can be avoided by forming the floor-side projecting portion 31a at a position corresponding to the device.

In addition, while the cab reinforcing beam 37 is connected to the right column 35 in the present embodiment, the position of the column 35 to which the cab reinforcing beam 37 is connected is not limited. For example, when the frame-side projecting portion 34a is formed in a left portion of the lower frame 34, the cab reinforcing beam 37 can be connected to the left column 35.

Furthermore, while a configuration in which an upper end of the cab reinforcing beam 37 is connected to the column 35 and a lower end of the cab reinforcing beam 37 is connected to the lower frame 34 has been described in the present embodiment, a connection mode of the cab reinforcing beam 37 is not limited thereto. For example, both ends of the cab reinforcing beam 37 may be respectively connected to front and rear columns 35 such that the cab reinforcing beam 37 straddles the frame-side projecting portion 34a.

As described above, since the present invention achieves a highly practical effect of enabling interference between a device provided on an upper slewing body and a cab to be avoided while securing a wide space in the cab, the present invention is extremely useful and has a wide industrial applicability.

The specific embodiment described above primarily includes an invention configured as described below.

The present invention provides a construction machine including: a lower propelling body; an upper slewing body including an upper frame which is provided on the lower propelling body so as to be revolvable; a cab supported on the upper frame of the upper slewing body; and a device provided on the upper frame, wherein the cab includes a floor plate which is provided on the upper frame and which constitutes a floor surface of the cab, a frame-shaped lower frame which extends along a peripheral edge of the floor plate and which is fixed onto the floor plate, a column standing on the lower frame, and a panel member which is supported by the lower frame and the column and which constitutes an outer surface of the cab, the device is arranged below the floor plate such that a part of the device overlaps with a peripheral edge of the lower frame in plan view, a floor-side projecting portion which projects upward is provided on the peripheral edge of the floor plate and a floor-side housing portion which opens downward and which houses the device is provided below the floor-side projecting portion, and a frame-side projecting portion which projects upward is provided on the lower frame and a frame-side housing portion which opens downward and which houses the floor-side projecting portion is provided below the frame-side projecting portion.

In the present invention, the device is arranged below the floor plate such that a part of the device overlaps with the peripheral edge of the lower frame in plan view. In addition, the floor-side projecting portion which projects upward is provided on a peripheral edge of the floor plate of the cab and the floor-side housing portion which opens downward and which houses the device is provided below the floor-side projecting portion. Furthermore, the frame-side projecting portion which projects upward is provided on the lower frame and the frame-side housing portion which opens downward and which houses the floor-side projecting portion is provided below the frame-side projecting portion.

Accordingly, interference between the device and the floor plate and the lower frame can be avoided in a vertical direction by the floor-side projecting portion and the frame-side projecting portion. Therefore, an inner width of the frame-shaped lower frame provided along the peripheral edge of the floor plate (for example, an interval between portions respectively arranged on both sides in a vehicle width direction) can be kept more or less the same as in conventional configurations. Accordingly, since a mounting operation of the lower frame can be performed in a large secured space inside the cab, workability is improved. In addition, since the need for designing devices such as a control box in smaller sizes in order to secure the large space inside the cab is omitted, standardization of devices can be promoted.

In the construction machine, the frame-side projecting portion can favorably be fitted to the floor-side projecting portion from above.

In this aspect, by fitting the frame-side projecting portion to the floor-side projecting portion, the frame-side projecting portion and the floor-side projecting portion can be assembled in a state where the lower frame is positioned relative to the floor plate. As a result, workability of a mounting operation of the floor plate and the lower frame can be improved.

In the construction machine, a guiding surface for guiding the floor-side projecting portion and the frame-side projecting portion to a predetermined fitting position during a fitting process thereof is favorably formed on at least one of the floor-side projecting portion and the frame-side projecting portion.

According to this aspect, workability of an assembly operation of the floor plate and the lower frame can be further improved. Specifically, the lower frame is placed on the floor plate by being gradually lowered toward the floor plate in a state where the lower frame is suspended by a crane or the like. In this case, since the guiding surface is formed on at least one of the floor-side projecting portion and the frame-side projecting portion, the frame-side projecting portion can be fitted to the floor-side projecting portion in a smooth manner.

In the construction machine, the guiding surface favorably includes a floor-side inclined surface that is inclined on at least one end side of the floor-side projecting portion in a longitudinal direction along the peripheral edge of the floor plate such that the floor-side projecting portion becomes narrower as extending upward and a frame-side inclined surface that is inclined on at least one end side of the frame-side projecting portion in the longitudinal direction such that an opening of the frame-side housing portion becomes wider as extending downward.

In this aspect, the floor-side inclined surface that is inclined such that the floor-side projecting portion becomes narrower as extending upward is formed on at least one end side of the floor-side projecting portion in the longitudinal direction. In addition, the frame-side inclined surface that is inclined such that the opening of the frame-side housing portion becomes wider as extending downward is formed on at least one end side of the frame-side projecting portion in the longitudinal direction.

According to this aspect, by causing the inclined surfaces to slide against each other in accordance with a descent of the lower frame toward the floor plate, the floor-side projecting portion and the frame-side projecting portion can be fitted to each other in a smooth manner.

The construction machine favorably further includes a connecting mechanism that connects the frame-side projecting portion and the column with each other, and the frame-side projecting portion is provided on the lower frame at a position other than an standing position of the column.

In this aspect, the frame-side projecting portion is provided on the lower frame at a position other than the standing position of the column. Therefore, when the column is suspended by a crane or the like in a state where the column and the lower frame are connected to each other, the lower frame is to be supported at a position (the column) other than the frame-side projecting portion and deflection of the lower frame may occur at the frame-side projecting portion. However, in the aspect described above, since the connecting mechanism that connects the frame-side projecting portion and the column with each other is provided, a suspending force generated on the column can also be transferred to the frame-side projecting portion via the connecting mechanism. Therefore, deflection of the lower frame during suspension can be suppressed.

In the construction machine, the connecting mechanism favorably includes a cab reinforcing member that is connected to the column of the cab above the frame-side projecting portion and a connecting member having an upper end that is connected to the cab reinforcing member and a lower end that is connected to an upper surface of the frame-side projecting portion.

In this aspect, the column and the frame are connected to each other by the cab reinforcing member that is connected to the column and the connecting member that is connected to both the cab reinforcing member and the frame-side projecting portion.

According to this aspect, during suspension of the lower frame, a suspending force generated on the column can be transferred to the frame-side projecting portion via the cab reinforcing member and the connecting member. As a result, deflection of the lower frame can be prevented.

In the construction machine, the cab reinforcing member favorably includes an upper end that is connected to the column and a lower end that is connected to the lower frame at a position opposite to the column across the frame-side projecting portion.

In this aspect, the column and the cab reinforcing member are connected to the lower frame at both side positions of the frame-side projecting portion and, at the same time, the connecting member is connected to the frame-side projecting portion. Therefore, since a suspending force generated on the column during suspension of the lower frame can be transferred to both side positions of the frame-side projecting portion and to the frame-side projecting portion, deflection of the lower frame can be prevented more effectively.

This application is based on Japanese Patent Application No. 2012-114451 filed in Japan Patent Office on May 18, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A construction machine comprising:
a lower propelling body;
an upper slewing body including an upper frame which is provided on the lower propelling body so as to be revolvable;
a cab supported on the upper frame of the upper slewing body; and
a device provided on the upper frame, wherein
the cab includes a floor plate which is provided on the upper frame and which constitutes a floor surface of the cab, a frame-shaped lower frame which extends along a peripheral edge of the floor plate and which is fixed onto the floor plate, a column standing on the lower frame, and a panel member which is supported by the lower frame and the column and which constitutes an outer surface of the cab,
the device is arranged below the floor plate such that a part of the device overlaps with a peripheral edge of the lower frame in plan view,
a floor-side projecting portion which projects upward is provided on the peripheral edge of the floor plate and a floor-side housing portion which opens downward and which houses the device is provided below the floor-side projecting portion, and
a frame-side projecting portion which projects upward is provided on the lower frame and a frame-side housing portion which opens downward and which houses the floor-side projecting portion is provided below the frame-side projecting portion.

2. The construction machine according to claim 1, wherein the frame-side projecting portion can be fitted to the floor-side projecting portion from above.

3. The construction machine according to claim 2, wherein a guiding surface for guiding the floor-side projecting portion and the frame-side projecting portion to a predetermined fitting position during a fitting process thereof is formed on at least one of the floor-side projecting portion and the frame-side projecting portion.

4. The construction machine according to claim 3, wherein the guiding surface includes a floor-side inclined surface that is inclined on at least one end side of the floor-side projecting portion in a longitudinal direction along the peripheral edge of the floor plate such that the floor-side projecting portion becomes narrower as extending upward and a frame-side inclined surface that is inclined on at least one end side of the frame-side projecting portion in the longitudinal direction such that an opening of the frame-side housing portion becomes wider as extending downward.

5. The construction machine according to claim 1, further comprising
a connecting mechanism that connects the frame-side projecting portion and the column with each other, wherein
the frame-side projecting portion is provided on the lower frame at a position other than an standing position of the column.

6. The construction machine according to claim 5, wherein the connecting mechanism includes a cab reinforcing member that is connected to the column of the cab above the frame-side projecting portion and a connecting member having an upper end that is connected to the cab reinforcing member and a lower end that is connected to an upper surface of the frame-side projecting portion.

7. The construction machine according to claim 6, wherein the cab reinforcing member includes an upper end that is connected to the column and a lower end that is connected to the lower frame at a position opposite to the column across the frame-side projecting portion.

* * * * *